United States Patent Office 3,260,756
Patented July 12, 1966

3,260,756
METHOD OF PREPARING BIS HYDROXY BENZYL SULFIDES
Francis X. O'Shea, Wolcott, and Frank B. Root, Waterbury, Conn., assignors to United States Rubber Company, New York, N.Y., a corporation of New Jersey
No Drawing. Filed Aug. 1, 1963, Ser. No. 299,148
11 Claims. (Cl. 260—609)

This invention relates to a novel method of preparing bis(3,5-dihydrocarbyl-X-hydroxybenzyl) sulfides, wherein X is an even integer not greater than 6 (i.e., 2, 4 or 6), of the type:

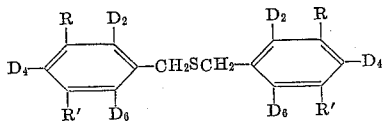

wherein $D_2$, $D_4$ and $D_6$ are 2 hydrogen atoms and 1 hydroxy group (in any order); and R and R' are alkyl, cycloalkyl or aralkyl groups of less than 13 carbon atoms each.

Compounds of this type are useful as antioxidants, have been previously described, and have been previously made by the direct reaction of sterically hindered 2,6-dihydrocarbylphenols with formaldehyde and an alkali metal sulfide (see copending U.S. Serial No. 31,542, filed May 25, 1960, by O'Shea).

In addition, in U.S. Patents 2,415,833 (issued February 18, 1947) and 2,488,134 (issued November 15, 1949), L. O. Mikeska and A. R. Kittleson described the preparation of a compound of the type:

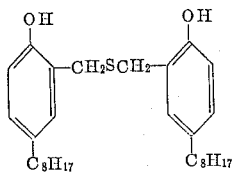

by chloromethylation of p-octylphenol and subsequent reaction of the chloromethylated product with $K_2S$.

This invention contemplates and has as its primary object the provision of a superior general method of preparing bis(3,5 - dihydrocarbyl - X - hydroxybenzyl)sulfides, wherein X is 2, 4 or 6. It is an object of this invention to provide a method of forming such compounds from readily available and inexpensive intermediates which can be readily prepared in high yield and purity.

It is a further object of this invention to provide such a method wherein the reaction of the intermediate with the other reactant is rapid and complete with only negligible formation of by-products.

Still another object of this invention is the provision of a method broadly useful in forming such bis-sulfides whether the bis-sulfides are highly hindered or less hindered homologs. A further object of this invention is the provision of such a method which utilizes a relatively low pH reaction system to give a product of good color.

Still another object of this invention is to provide a method in which the by-products of the final reaction step can be easily reused in situ in the preparation of more intermediate for use in the method of this invention.

Briefly, the present invention comprises the method of preparing a bis(3,5-dihydrocarbyl-hydroxybenzyl) sulfide by reacting a 3,5-dihydrocarbyl-hydroxybenzyl N,N-dialkyl-dithiocarbamate with an alkali metal sulfide.

The present invention provides a superior general method for preparing bis(3,5-dihydrocarbyl-X-hydroxybenzyl) sulfides, wherein X is 2, 4 or 6, which consists of the reaction of 3,5-dihydrocarbyl-hydroxybenzyl N,N-dialkyl-dithiocarbamate intermediates of the type:

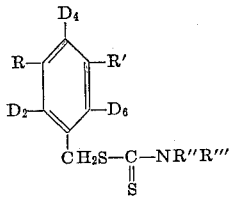

wherein $D_2$, $D_4$ and $D_6$ are 2 hydrogen atoms and 1 hydroxy group (in any order); R and R' are alkyl, cycloalkyl or aralkyl groups of less than 13 carbon atoms each; and R'' and R''' are lower alkyl groups of less than 6 carbon atoms each; with an alkali metal sulfide according to the following equation:

(1)
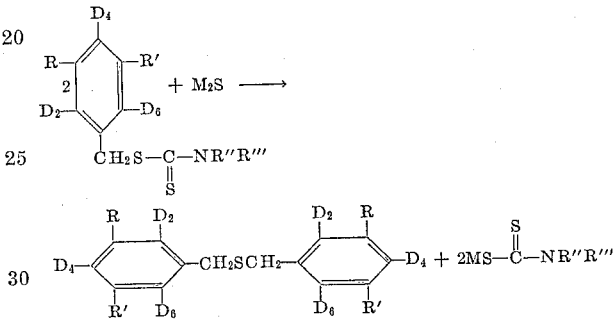

wherein M is an alkali metal such as Na, K, etc. This reaction is effected in an organic, water-miscible, solvent such as methanol, ethanol, isopropanol, acetone, dioxane, ethylene glycol dimethyl ether, etc. The reaction can be carried out at a temperature ranging from about room temperature (ca. 20° C.) to about 100° C. for a period of time up to about four hours.

The 3,5-dihydrocarbyl - hydroxybenzyl N,N-dialkyldithiocarbamate intermediates used in the method of this invention may be inexpensively prepared by reacting 2,4-, 4,6- or 2,6- dihydrocarbylphenol with formaldehyde, carbon disulfide and a dialkylamine according to the following general equation based on the reaction described by A. F. Hardman in U.S. Patent 2,757,174 (issued July 31, 1956):

(2)
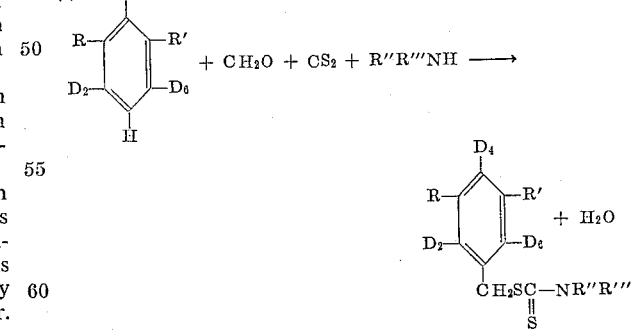

wherein $D_2$, $D_4$ and $D_6$ are 2 hydrogen atoms and one hydroxy group (in any order); R and R' are alkyl, cycloalkyl or aralkyl groups of less than 13 carbon atoms each; and R'' and R''' are lower alkyl groups of less than 6 carbon atoms each.

The dihydrocarbylphenols (e.g., 2,4-dimethylphenol, 2-methyl - 4 - nonylphenol, 2,4-dinonylphenol, 2-alpha-alpha-dimethylbenzyl-4-methylphenol, 2-methyl-4-(alpha-methylbenzyl)phenol, 2,4-di(alpha,alpha-dimethylbenzyl)phenol, 2,6-di-t-butylphenol, 2,6-xylenol, 2,4-dicyclohexylphenol, 2-methyl-4-cyclohexylphenol, 2-cyclohexyl-4-methylphenol, etc.) enter into this reaction very readily and, as a matter of fact, the desired intermediates can be prepared under much milder conditions than those claimed by Hardman. For example, the intermediates used in the method of this invention are ordinarily prepared in aqueous methanol at reflux temperature. Any dialkylamine may be used, but the low molecular weight members such as dimethylamine are preferred.

In the process of this invention, an intermediate of the type described above—whether prepared as indicated in Equation 2, supra, or by other means such as that shown in Example 1—is reacted, according to Equation 1, supra, with approximately 0.5 molar equivalent of an alkali metal sulfide. If less than 0.5 molar equivalent of the alkali metal sulfide is used, reaction will be incomplete and the product will contain unreacted starting material. If more than 0.5 molar equivalent of the alkali metal sulfide is used, reaction will be complete but recovery of the carbon disulfide and the amine from the by-product dialkyldithiocarbamate will be complicated by the presence of excess metal sulfide. For these reasons, the use of about 0.5 molar equivalent of the alkali metal sulfide is preferred.

It should be noted that an alkali metal hydrosulfide, such as NaSH, may be used in combination with an equimolar amount of an alkali metal hydroxide, such as NaOH, as a precursor or source of the alkali metal sulfide, such as $Na_2S$.

Preferred solvents for the reaction mixture formed in the method of this invention are methanol, ethanol and isopropanol. The preferred temperature is in the range of 50°–100° C., the reaction ordinarily being carried out at or near the reflux temperature of the solution. The preferred time of reaction is up to about 2 hours. Longer times may be used, but they are not necessary as the reaction is generally complete in 30 minutes or less. The preferred pH of the reaction system is about 8.5. Preferably the final product would be colorless, although the final product is, as a matter of fact closer to an off-white color.

Example 1

Preparation of bis(3-methyl-4-hydroxy-5-t-butylbenzyl) sulfide.

354 lbs. of a 42.6% aqueous solution of sodium dimethyldithiocarbamate, 164 lbs. of 2-methyl-6-t-butylphenol, 97 lbs. of methanol as solvent and 80 lbs. of 37% aqueous formaldehyde were charged with agitation to a 100 gallon glass lined reactor. Over a period of 30 minutes, 53 lbs. of 66° Bé. sulfuric acid were added while the temperature of the mixture was held below 35° C. The mixture was then refluxed for 2½ hours, cooled to 50° C., and the solid portion was allowed to crystallize. The mother liquor was removed through a filter stick at 50° C. and the solid (3-methyl-5-t-butyl - 4 - hydroxybenzyl N,N - dimethyldithiocarbamate) was washed with two 50 gallon portions of 50° C. water.

Methanol (97 lbs.) was then added to the solid and, after 5 minutes of agitation, a solution of 60 lbs. of 60% sodium sulfide and 40 lbs. of water was charged to the reactor. The reaction mixture was heated to reflux for 30 minutes and then cooled to 30° C. The product was separated by filtration, washed first with a solution of 70 lbs. of water and 30 lbs. of methanol and then with hot water, and dried. The yield of bis(3-methyl-4-hydroxy-5-t-butylbenzyl) sulfide was 181 lbs. (94% yield), M.P.=115.5°–118° C.

Example 2

Preparation of bis(3,5-di-t-butyl-4-hydroxybenzyl) sulfide.

2,6-di-t-butylphenol (103 g., 0.5 mole), 37% aqueous formaldehyde (40.5 g., 0.5 mole), 25% aqueous dimethylamine (90 g., 0.5 mole), carbon disulfide (40 g., 0.52 mole) and 400 ml. of ethanol were mixed and heated under reflux for 1½ hours. The precipitate which formed was separated by filtration and washed with ethanol, yielding 152 g. (90% yield) of 3,5-di-t-butyl-4-hydroxybenzyl N,N-dimethyldithiocarbamate.

A portion of the intermediate thus obtained weighing 17 g. (0.05 mole) was added to a solution of 12 g. (0.05 mole) of $Na_2S \cdot 9H_2O$ in 10 ml. of water and 50 ml. of methanol. The mixture was heated to reflux and a heavy slurry of a white precipitate formed. The slurry was cooled and diluted with 100 ml. of water. The product was then separated by filtration and dried, yielding 11.5 g. (98% yield) of bis(3,5-di-t-butyl-4-hydroxybenzyl)sulfide, M.P.=141°–142° C.

Example 3

Preparation of bis(3,5-dimethyl-4-hydroxybenzyl) sulfide.

A mixture of 244 g. (2 moles) of 2,6-xylenol, 162 g. (2 moles) of 37% aqueous formaldehyde, 360 g. (2 moles) of 25% aqueous dimethylamine and 160 g. (2.1 moles) of carbon disulfide in 400 ml. of methanol was stirred and refluxed for 2 hours. The mixture formed 2 layers and, after cooling and stirring, the lower layer crystallized. The product was separated by filtration and dried, yielding 467 g. (90% yield) of 3,5-dimethyl-4-hydroxybenzyl N,N-dimethyldithiocarbamate.

A portion of the intermediate thus obtained (127 g., 0.5 mole) was dissolved in 350 ml. of methanol by heating at 50° C. A solution of 66 g. (0.275 mole) of $Na_2S \cdot 9H_2O$ in 50 ml. of water was then added and the mixture was refluxed for 15 minutes. The solution was then cooled and diluted with 350 ml. of water. The white precipitate which formed was separated by filtration, washed with water and dried, yielding 70 g. (90% yield) of bis(3,5 - dimethyl - 4 - hydroxybenzyl)sulfide, M.P.=97°–99° C.

Example 4

Preparation of bis(2-hydroxy-3-t-butyl - 5 - methylbenzyl)sulfide.

A solution of 12 g. (0.05 mole) of $Na_2S \cdot 9H_2O$ in 150 ml. of ethanol was added to a reactor charged with 29.7 g. (0.1 mole) of 2-hydroxy-3-t-butyl-5-methylbenzyl N,N-dimethyldithiocarbamate. The mixture was heated to reflux for 20 minutes, diluted with water and cooled. The product was separated by filtration, washed and dried. The yield of bis(2-hydroxy-3-t-butyl-5-methylbenzyl) sulfide was 83%.

Example 5

Preparation of bis [2-hydroxy-3-(1,1,3,3-tetramethylbutyl)-5-methylbenzyl] sulfide.

A solution of 110 g. (0.5 mole) of 2-(1,1,3,3-tetramethylbutyl)-p-cresol, 100 g. (1.25 mole) of 37% aqueous formaldehyde and 112 g. (0.5 mole) of 25% aqueous dimethylamine in 350 ml. of methanol was heated at reflux for two hours. The solution was then cooled in an ice bath and the white, crystalline product was separated by filtration and dried. The weight of the 2-(1,1,3,3-tetramethylbutyl)-4-methyl-6 - dimethylaminomethylphenol was 126 g. (91% yield), M.P.=43°–48° C.

A portion of the latter compound weighing 83 g. (0.3 mole) and 24 g. (0.3 mole) of carbon disulfide were combined with 100 ml. of ethylene glycol monoethyl ether and heated at reflux for seven hours. The solution was then cooled and poured into water. The product separated as an oil and then crystallized. It was dried and recrystallized from hexane. The yield of 2-hydroxy-3 - (1,1,3,3 - tetramethylbutyl) - 5 - methylbenzyl N,N-dimethyldithiocarbamate was 44 g. (41% yield), M.P. =105°–107° C.

A solution of 35.3 g. (0.1 mole) of the latter compound and 12 g. (0.05 mole) of $Na_2S \cdot 9H_2O$ in 250 ml. of 80% aqueous ethanol was heated at reflux for ten minutes. The hot solution was filtered and cooled. The precipitate which crystallized out was separated by filtration and washed with 80% aqueous ethanol. The yield of bis[2-hydroxy-3-(1,1,3,3-tetramethylbutyl)-5-methylbenzyl]sulfide was 21.5 g. (87% yield), M.P. =90°–92° C.

*Example 6*

Preparation of bis[2-hydroxy-3-(alpha,alpha-dimethylbenzyl)-5-methylbenzyl]sulfide.

A solution of 7.2 g. (0.02 mole) of 2-hydroxy-3-(alpha,alpha-dimethylbenzyl)-5-methylbenzyl N,N-dimethyldithiocarbamate (prepared in 47% yield from the reaction of 2-(alpha,alpha-dimethylbenzyl)-4-methyl-6-dimethylaminomethyl phenol with carbon disulfide) and 2.4 g. (0.01 mole) of $Na_2S \cdot 9H_2O$ in 25 ml. of ethanol was heated at reflux for 30 minutes. The hot solution was filtered and cooled. The precipitate which crystallized out was separated by filtration, washed with ethanol and dried. The yield of bis[2-hydroxy-3-(alpha,alpha-dimethylbenzyl)-5-methylbenzyl] sulfide was 3.5 g. (70% yield), M.P. =113°–114° C.

*Example 7*

Using the procedure of Examples 2 and 3, the following compounds were also prepared:

Bis(3,5-dicyclohexyl-4-hydroxybenzyl)sulfide (76% yield, M.P. =128°–132° C.); and
Bis(3,5-diisopropyl-4-hydroxybenzyl)sulfide (93% yield, M.P. =92° C.).

The previously undescribed method of the present invention offers the following distinct advantages over the methods previously described for preparing related compounds:

(1) The intermediate can be readily prepared in high yield and purity. Chloromethylation of substituted phenols to give the type of intermediate described by Mikeska and Kittleson, supra, is inherently difficult according to Adams, "Organic Reactions," vol. 1, p. 65 (John Wiley and Sons, New York).

(2) The reaction of the intermediate with the alkali metal sulfide is rapid and complete. By-product formation is negligible, whereas the direct reaction of a 2,6-dihydrocarbylphenol with formaldehyde and an alkali metal sulfide in many cases leads to formation of undesired by-products.

(3) The reactants are readily available and inexpensive.

(4) The relatively low pH (ca. 8.5) of the reaction system of this invention results in a product more nearly colorless than the purple product usually resulting from the direct reaction which occurs at a higher pH (ca. 13.5) between a dialkylphenol, formaldehyde and sodium sulfide.

(5) Since, after removal of the final product, the mother liquor contains predominantly sodium dialkyldithiocarbamate, it can be neutralized with acid to regenerate the $CS_2$ and dialkylamine which can then be reused in situ to prepare more intermediate.

(6) The method is broadly applicable, utilizing, as starting materials, both highly hindered 2,4-, 4,6- or 2,6-disubstituted phenols such as 2,6-di-t-butylphenol and less hindered homologs such as 2,6-dimethylphenol.

It should be understood that the precise proportions of the materials utilized may be varied, equivalent chemical materials may be employed, and the conditions of reaction may be modified, if desired, without departing from the spirit and scope of the invention as defined in the appended claims.

Having thus described our invention, what we claim and desire to protect by Letters Patent is:

1. The method of preparing a product of the formula

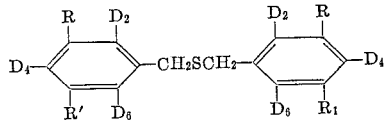

by reacting an intermediate of the formula

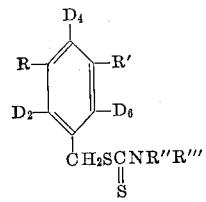

with an alkali metal sulfide or an alkali metal hydrosulfide precursor thereof; wherein any two of the substituents $D_2$, $D_4$ and $D_6$ are hydrogen while the third of the said substituents is an hydroxyl group, and wherein R and R' are each alkyl, cycloalkyl or aralkyl groups having less than 13 carbon atoms each, and wherein R'' and R''' are alkyl groups of less than 6 carbon atoms each.

2. The method of claim 1 wherein said alkali metal sulfide is sodium sulfide or potassium sulfide.

3. The method of claim 1 wherein said alkali metal sulfide is sodium sulfide.

4. The method of claim 1 wherein $D_4$ is an hydroxyl group.

5. The method of claim 1 wherein $D_4$ is an hydrogen atom.

6. The method of claim 1 wherein the molar equivalent ratio of said alkali metal sulfide and said intermediate is approximately 0.5:1.0.

7. The method of claim 1 wherein said intermediate and said alkali metal sulfide are reacted at from about 50° C. to about 100° C. for less than 2 hours.

8. The method of claim 1 wherein said intermediate and said alkali metal sulfide are reacted in a water-miscible organic solvent.

9. The method of claim 1 wherein said alkali metal sulfide is formed in situ from equimolar amounts of an alkali metal hydrosulfide and an alkali metal hydroxide.

10. The method of claim 1 wherein $D_4$ is an hydroxyl group, and 0.5 molar equivalent of sodium sulfide is present for each molar equivalent of said intermediate in methanol, the reaction being conducted at a temperature of from 20° C. to 100° C.

11. The method of preparing bis(3-methyl-4-hydroxy-5-t-butyl benzyl)sulfide by reacting 3-methyl-5-t-butyl-4-hydroxybenzyl N,N-dimethyldithiocarbamate with sodium sulfide.

No references cited.

CHARLES B. PARKER, *Primary Examiner.*
DELBERT R. PHILLIPS, *Assistant Examiner.*